(No Model.)
M. J. WALSH.
FLEXIBLE HOSE OR PIPE.
No. 255,357. Patented Mar. 21, 1882.
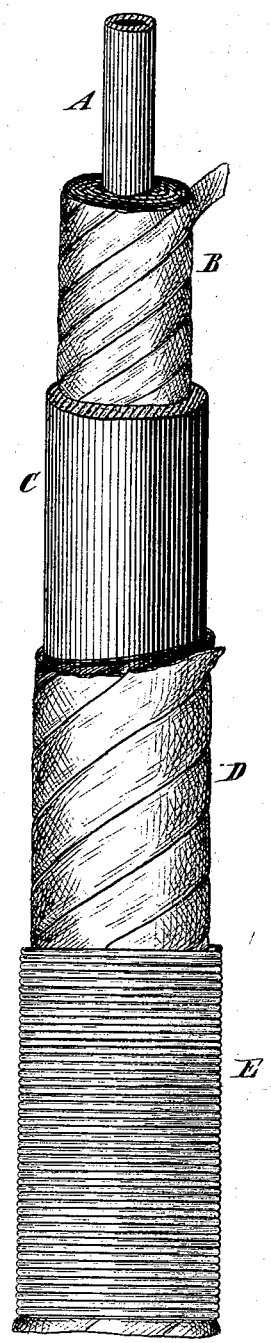
Witnesses:
Fred Haynes
A. C. Webb
Inventor:
Maurice J. Walsh
by his Attorneys
Brown & Brown

UNITED STATES PATENT OFFICE.

MAURICE J. WALSH, OF NEW YORK, N. Y.

FLEXIBLE HOSE OR PIPE.

SPECIFICATION forming part of Letters Patent No. 255,357, dated March 21, 1882.

Application filed January 12, 1881. Renewed February 2, 1882. (No model.)

*To all whom it may concern:*

Be it known that I, MAURICE J. WALSH, of New York, in the county and State of New York, have invented certain new and useful Improvements in Flexible Pipe or Hose, of which the following is a specification.

The object of my invention is to produce a strong yet flexible pipe or hose suitable for conveying a motive agent under great pressure to portable apparatus actuated thereby.

To this end my invention consists in flexible hose or pipe composed of a layer of india-rubber, leather, or like material, spirally-wound layers of a stout woven fabric—such as duck—surrounding said layer of india-rubber, leather, or like material, a second layer of india-rubber, leather, or like material inclosing the said spirally-wound layers, superposed layers of the stout woven fabric or other suitable material, and an external wrapping of flexible wire, preferably copper wire, serving to strengthen and protect the hose or pipe.

The accompanying drawing represents a piece of flexible pipe or hose embodying my invention, and sectioned so as to exhibit to advantage its component parts.

A designates a layer or tube, which is preferably made of india-rubber, but may be made of leather or like material. Surrounding this tube are several layers, B, of a stout woven fabric—such, for instance, as duck—coated on one or both sides with india-rubber. These layers are wound spirally upon the layer or tube A, and in number correspond to the strength of pipe or hose desired to be obtained. Outside these layers B of woven fabric is a tube or layer, C, which is preferably made of india-rubber, but which, like the tube or layer A, may be made of leather or like material. Surrounding the tube or layer C are a number of layers, D, of a stout woven fabric, such as duck. These layers are spirally wound on the tube or layer C, and need not be coated with india-rubber. Outside the layers D of stout woven fabric, a wire, E, of copper or other pliable or flexible metal, is coiled closely to strengthen and protect the hose.

It will be seen that by my invention I produce a flexible pipe or hose which will afford convenience for moving an apparatus to which it may be attached from place to place, and yet will be capable of sustaining enormous pressures.

What I claim as my invention, and desire to secure by Letters Patent, is—

Flexible hose or pipe composed of a layer of india-rubber, leather, or like material, spirally-wound layers of a stout woven fabric—such as duck—surrounding said layer of india-rubber, leather, or like material, a second layer of india-rubber, leather, or like material inclosing the said spirally-wound layers, superposed layers of the stout woven fabric or other suitable material, and an external wrapping of flexible wire, preferably copper wire, serving to strenghten and protect the hose or pipe, substantially as and for the purpose specified.

MAURICE J. WALSH.

Witnesses:
T. J. KEANE,
E. GLATZMAYER.